United States Patent [19]

Okamura et al.

[11] Patent Number: 4,867,284
[45] Date of Patent: Sep. 19, 1989

[54] ROTARY DISC FOR DISC BRAKE ASSEMBLY

[75] Inventors: Hiromasa Okamura; Masahiro Yamada, both of Toyota, Japan

[73] Assignee: Toyota Jidosha Kabushiki Kaisha, Aichi-Ken, Japan

[21] Appl. No.: 741,013

[22] Filed: Jun. 3, 1985

Related U.S. Application Data

[63] Continuation of Ser. No. 500,993, Jun. 3, 1983, abandoned.

[30] Foreign Application Priority Data

Jun. 15, 1982 [JP] Japan .................................. 57-102629

[51] Int. Cl.⁴ ...................... F16D 65/10; F16D 65/78; F16F 15/10
[52] U.S. Cl. .................. 188/218 XL; 74/574; 181/207; 181/209; 188/264 AA
[58] Field of Search ........ 188/218 XL, 218 A, 218 A, 188/218 R, 264 AA, 18 A, 378, 73.2, 73.37; 74/574; 181/207–209; 301/5 R, 6 WB; 295/7; 416/500

[56] References Cited

U.S. PATENT DOCUMENTS

| | | | |
|---|---|---|---|
| 2,129,178 | 9/1938 | Jordan | 295/7 |
| 2,379,255 | 6/1945 | Rubissow | 74/574 |
| 2,532,086 | 11/1950 | Chapman et al. | 188/218 A |
| 3,298,476 | 1/1967 | Day | 188/218 A |
| 3,307,669 | 3/1967 | Klinkenberg | 188/218 A X |
| 3,378,115 | 4/1968 | Stephens | 188/218 A |
| 3,509,973 | 5/1970 | Kimata | 188/218 A X |
| 3,866,977 | 2/1975 | Rice | 188/218 A X |
| 3,979,154 | 9/1976 | Groff | 301/6 WB X |
| 4,027,549 | 6/1977 | Colletti | 188/218 A X |
| 4,043,431 | 8/1977 | Elleye | 188/218 XL X |
| 4,120,386 | 10/1978 | Airheart | 188/218 XL |
| 4,291,786 | 9/1981 | Ito | 188/218 A |
| 4,379,501 | 4/1983 | Hagiwara et al. | 188/218 XL |
| 4,523,666 | 6/1985 | Murray | 74/574 X |

FOREIGN PATENT DOCUMENTS

| | | | |
|---|---|---|---|
| 2835670 | 12/1979 | Fed. Rep. of Germany | 188/218 A |
| 2537038 | 3/1977 | Fed. Rep. of Germany | 188/218 A |
| 154533 | 9/1982 | Japan | 188/218 A |
| 221026 | 12/1983 | Japan | 188/218A |
| 1148210 | 4/1969 | United Kingdom | 188/218 XL |
| 2125911 | 3/1984 | United Kingdom | 188/218 A |

*Primary Examiner*—Robert J. Oberleitner
*Attorney, Agent, or Firm*—Kenyon & Kenyon

[57] ABSTRACT

A rotary disc for a disc brake assembly in which a pair of nodes or antinodes in all the vibration modes are fixed to rotate integrally with the rotary disc, thereby to prevent a standing vibration mode of all the diametric nodes. A pair of diametrically opposed outer peripheral portions of the disc are made heavier and more rigid than the remaining outer peripheral portions of the disc.

1 Claim, 1 Drawing Sheet

ROTARY DISC FOR DISC BRAKE ASSEMBLY

This application is a continuation of application Ser. No. 06/500,993, filed June 3, 1983, now abandoned.

BACKGROUND OF THE INVENTION

The present invention relates to a rotary disc for a disc brake assembly arranged to be pressed at its outer peripheral portion by a pair of brake friction pads in the brake assembly.

In general, the outer peripheral portion of such a conventional rotary disc as described above has uniform mass and rigidity. For this reason, when the outer peripheral portion of the rotary disc is vibrated at one point, node and antinode positions of a vibration mode of the rotary disc are determined by the vibrated point, and these positions vary with change of the vibrated point. This means that such node and antinode positions in the vibration mode of the rotary disc are determined by the assembled position of a brake friction pad which acts to apply a vibration to the rotary disc in braking operation. In other words, there occurs a standing vibration mode with fixed nodes and antinodes on the rotary disc during braking. Such a standing vibration mode causes undesired noises at its resonant frequency. It is also noted that the same standing vibration mode does not occur in all disc brake assemblies because the undesired braking noises occur in a close relationship with the construction of the entire disc brake assembly. This means that in many cases there occur a plurality of standing vibration modes on the same disc brake assembly. For the above reasons, it is required to eliminate such occurrence of all the standing vibration modes so as to effectively decrease the braking noises in all the disc brake assemblies.

SUMMARY OF THE INVENTION

It is, therefore, a primary object of the present invention to provide an improved rotary disc for a disc brake assembly in which a pair of nodes or antinodes in all the vibration modes are fixed to rotate integrally with the rotary disc, thereby to prevent a standing vibration mode of all the diametric nodes.

Another object of the present invention is to provide an improved rotary disc capable of reliably effecting the above-mentioned characteristic, particularly in relation to its thermal strength and deformation.

According to the present invention, the above objects are accomplished by providing a rotary disc wherein a pair of diametrically opposed outer peripheral portions of the disc are made higher in mass and more rigid than the remaining peripheral portions of the disc. With the above-described construction of the rotary disc, a node or an antinode in a vibration mode occurs always at the diametrically opposed pair of outer peripheral portions, and this pair of nodes or antinodes is fixed for all vibration modes. For example, in a vibration mode with two diametral nodes, one node will be displaced circumferentially from the other node by an angle of 90°, and two antinodes will be equidistant from the nodes. Similarly, in a vibration mode with a number n (n=3, 4, 5, ...) of diametral nodes, there will be n pairs of equally spaced antinodes or nodes. The above phenomena have been experimentally confirmed by the inventors.

BRIEF DESCRIPTION OF THE DRAWINGS

Additional objects and advantages of the present invention will become readily apparent from the following detailed description of the preferred embodiments thereof when taken together with the accompanying drawing in which.

DETAILED DESCRIPTION OF THE PREFERRED EMBODIMENTS

Figure 1:
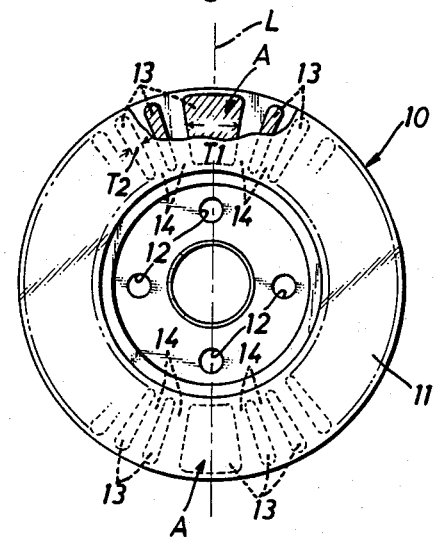
FIG. 1 is a partially broken away front view of a rotary disc of the ventilated type in accordance with the present invention.

With reference to FIG. 1, one embodiment of a rotary disc 10 of the ventilated type, in accordance with the present invention, is provided near its inner periphery with circumferentially spaced mounting holes 12 to permit attachment of the disc to a wheel hub (not shown) and is arranged to be pressed at its outer peripheral portion 11 by a pair of brake friction pads in a conventional disc brake assembly (not shown). The outer peripheral portion 11 of disc 10 is provided with a plurality of circumferentially spaced radial cooling fins 13 and an even number of circumferentially spaced radial vent holes 14 which are arranged symmetrically in relation to a diametral line L on disc 10.

In this embodiment, a pair of radial cooling fins 13, 13 located on the diameter L are respectively formed with greater circumferential thickness $T_1$ than the other radial cooling fins 13, and each circumferential space between adjacent cooling fins 13, 13 or each cross-sectional area of radial vent holes 14 is formed to be of equal size. Thus, the thickened cooling fins or radial portions A, A on the diameter L are respectively made heavier and more rigid than those of the other cooling fins 13, so that a node or an antinode in a vibration mode of disc 10 will always occur at the thickened radial portions A and A. In such construction as described above, a pair of nodes or antinodes in all the vibration modes of the disc 10 are fixed at the thickened radial portions A and A to rotate integrally with the disc 10 so as to prevent a standing vibration mode of all the diametral nodes.

Figure 2:
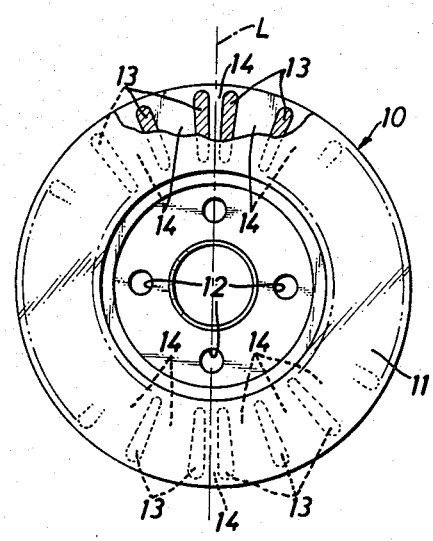
FIG. 2 is a partially broken away front view of a modification of the rotary disc type of FIG. 1.
Figure 3:
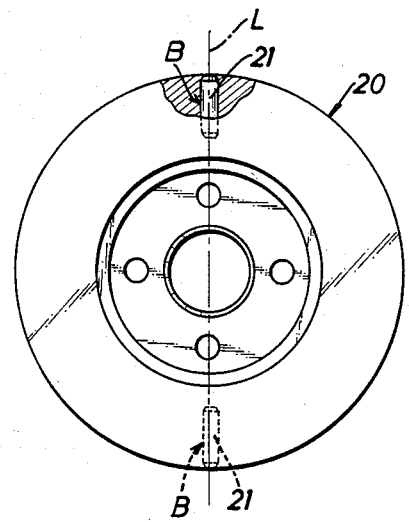
FIG. 3 is a partially broken away front view of a rotary disc of the solid type in accordance with the present invention.

In another embodiment of the present invention, as shown in FIG. 2, a pair of radial vent holes 14 on a diameter L of disc 10 may be formed smaller in size than the other vent holes to make the adjacent portions of the disc heavier and more rigid than other outer peripheral portions 11. Alternatively, in a rotary disc 20 of the solid type made of cast iron, as shown in FIG. 3, an insert element 21 of more rigid metal such as steel may be embedded as a pair of radial portions B, B of disc 20 on a diameter L to increase the rigidity of the disc on the diameter L. For the same purpose, the rotary disc 20 may be formed at its outer peripheral portion with a pair of outwardly extending projections which are located on the diameter L of disc 20.

Although certain specific embodiments of the present invention have been shown and described, it is obvious that many modifications thereof are possible. The invention, therefore, is not intended to be restricted to the embodiments shown in the drawings and description thereof, but is considered to include reasonable and obvious equivalents.

What is claimed is:

1. A ventilation rotary disc suitable for use in a disc brake assembly comprising:

an outer peripheral portion arranged to be compressed by a pair of brake friction pads in said brake assembly;

a plurality of circumferentially spaced radial cooling fins in said outer peripheral portion of the rotary disc defining an even number of circumferentially spaced radial vent holes interposed between said cooling fins; and means for eliminating the occurrence of static standing vibration modes in the rotary disc that are fixed relative to said brake friction pads, said means consisting essentially of a single pair of diametrically opposed, symmetrical regions of substantially equal configuration in said outer peripheral portion of the rotary disc, each of said diametrically opposed regions of said outer peripheral portion of the rotary disc comprising one vent hole of smaller cross-section than the others of said radial vent holes, such that in use a node or an antinode in a vibration mode of the rotary disc occurs always at said diametrically opposed regions thereof.

* * * * *